United States Patent
McMahon et al.

(10) Patent No.: US 10,641,102 B2
(45) Date of Patent: May 5, 2020

(54) TURBINE VANE CLUSTER INCLUDING ENHANCED VANE COOLING

(71) Applicant: United Technologies Corporation, Farmington, CT (US)

(72) Inventors: Shawn M. McMahon, West Hartford, CT (US); Christopher Whitfield, Manchester, CT (US); Kristopher K. Anderson, Manchester, CT (US); Jason B. Moran, Wilbraham, MA (US); Brett Alan Bartling, Monroe, CT (US); Christopher Perron, Tolland, CT (US); Justin M. Aniello, Ellington, CT (US); Stephanie Tanner, Colchester, CT (US); Dominic J. Mongillo, Jr., West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 186 days.

(21) Appl. No.: 15/790,505

(22) Filed: Oct. 23, 2017

(65) Prior Publication Data

US 2019/0071979 A1     Mar. 7, 2019

Related U.S. Application Data

(60) Provisional application No. 62/553,666, filed on Sep. 1, 2017.

(51) Int. Cl.
  *F01D 5/18* (2006.01)
  *F01D 9/06* (2006.01)
  (Continued)

(52) U.S. Cl.
  CPC .............. *F01D 5/186* (2013.01); *B23H 1/00* (2013.01); *B23P 15/02* (2013.01); *F01D 5/187* (2013.01);
  (Continued)

(58) Field of Classification Search
  CPC .......... F01D 5/186; F01D 5/187; F01D 9/041; F01D 9/065; F05D 2260/202
  See application file for complete search history.

(56) References Cited

U.S. PATENT DOCUMENTS

| 7,008,178 B2 | 3/2006 | Busch et al. |
| 7,204,019 B2 * | 4/2007 | Ducotey, Jr. ............. B23H 9/10 |
|  |  | 29/402.06 |

(Continued)

FOREIGN PATENT DOCUMENTS

WO     2014159575     10/2014

OTHER PUBLICATIONS

European Search Report for Application No. 18192117.2 dated Jan. 16, 2019.

*Primary Examiner* — Dwayne J White
*Assistant Examiner* — Jackson N Gillenwaters
(74) *Attorney, Agent, or Firm* — Carlson, Gaskey & Olds, P.C.

(57) ABSTRACT

A vane cluster for a gas turbine engine includes an outer diameter platform and an inner diameter platform. A plurality of vanes span from the outer diameter platform to the inner diameter platform. At least one inbound region is defined between a first vane of the plurality of vanes and a second vane of the plurality of vanes. The first vane includes a suction side facing the inbound region. Each of the vanes includes a leading edge core passage and a trailing edge core passage. A plurality of electrical discharge machined (EDM) holes are disposed within at least 0.500 inches (12.7 mm) of a leading edge of the first vane. Each of the EDM holes connect a leading edge core passage of the vane to an exterior surface of the vane.

20 Claims, 2 Drawing Sheets

(51) Int. Cl.
*B23H 1/00* (2006.01)
*B23P 15/02* (2006.01)
*F01D 9/04* (2006.01)
*F01D 25/12* (2006.01)

(52) U.S. Cl.
CPC ............ *F01D 9/041* (2013.01); *F01D 9/065* (2013.01); *F01D 25/12* (2013.01); *F05D 2220/32* (2013.01); *F05D 2230/12* (2013.01); *F05D 2240/121* (2013.01); *F05D 2240/122* (2013.01); *F05D 2240/124* (2013.01); *F05D 2250/141* (2013.01); *F05D 2260/202* (2013.01)

(56) References Cited

U.S. PATENT DOCUMENTS

| | | | |
|---|---|---|---|
| 7,997,866 B2 * | 8/2011 | Naik | F01D 5/186 416/97 R |
| 2005/0135923 A1 | 6/2005 | Coons et al. | |
| 2009/0169394 A1 * | 7/2009 | Crow | B23H 9/10 416/96 R |
| 2014/0219815 A1 | 8/2014 | Kohli et al. | |
| 2016/0047250 A1 * | 2/2016 | Lewis | F01D 5/186 415/115 |
| 2016/0194966 A1 | 7/2016 | Bergman et al. | |
| 2016/0273364 A1 * | 9/2016 | Bergholz | F23R 3/002 |
| 2018/0106156 A1 | 4/2018 | LoRicco et al. | |

\* cited by examiner

TURBINE VANE CLUSTER INCLUDING ENHANCED VANE COOLING

CROSS-REFERENCE TO RELATED APPLICATION

This application claims priority to U.S. Provisional Application No. 62/553,666 filed Sep. 1, 2017.

TECHNICAL FIELD

The present disclosure relates generally to vane clusters for a gas turbine engine, and more specifically to an enhanced vane cooling system for a vane cluster of a gas turbine engine.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. The turbine section is connected to the compressor section via a shaft, and rotation of the turbine section further drives the compressor section to rotate. In some examples, a fan is also connected to the shaft and is driven to rotate via rotation of the turbine as well.

Each of the compressor and the turbine sections include multiple stages, with each stage being constructed of a ring of rotating rotor blades paired with a ring of static vanes. In some examples, the static vanes are constructed of clusters, where multiple circumferentially adjacent vanes in a given stage are a single integral component. Each integral component is referred to as a cluster.

During operation, the compressor and turbine sections are exposed to high operating temperatures. In some cases the high operating temperatures are mitigated via the use of active cooling systems that pass cooling air through the static vanes. The cluster construction can, in some examples, result in inbound regions between the vanes in a single cluster that are difficult to cool using conventional cooling systems.

SUMMARY

In one exemplary embodiment a vane cluster for a gas turbine engine includes an outer diameter platform, an inner diameter platform, a plurality of vanes spanning from the outer diameter platform to the inner diameter platform, at least one inbound region defined between a first vane of the plurality of vanes and a second vane of the plurality of vanes, the first vane including a suction side facing the inbound region, each of the vanes including a leading edge core passage and a trailing edge core passage, and a plurality of electrical discharge machined (EDM) holes disposed within at least 0.500 inches (12.7 mm) of a leading edge of the first vane, each of the EDM holes connecting a leading edge core passage of the vane to an exterior surface of the vane.

In another example of the above described vane cluster for a gas turbine engine each EDM hole in the plurality of EDM holes is disposed on the leading edge of the first vane.

In another example of any of the above described vane clusters for a gas turbine engine each EDM hole in the plurality of EDM holes includes including a primary passage portion and a diffuser portion.

In another example of any of the above described vane clusters for a gas turbine engine each of the primary passage portions has a diameter of approximately 0.015 inches (0.381 mm).

In another example of any of the above described vane clusters for a gas turbine engine each of the primary passage portions connects to the leading edge core passage of the first vane, and each of the diffuser portions connects to the leading edge of the first vane.

In another example of any of the above described vane clusters for a gas turbine engine each of the diffuser portions includes a gradual increase in diameter from a connection to the corresponding primary passage portion to an exit at the leading edge of the first vane.

In another example of any of the above described vane clusters for a gas turbine engine each of the diffuser portions is connected to the corresponding primary passage portion via an opening and wherein the diffuser portions are offset from the primary portions at the corresponding opening.

In another example of any of the above described vane clusters for a gas turbine engine the plurality of EDM holes includes from six to ten holes.

In another example of any of the above described vane clusters for a gas turbine engine the plurality of EDM holes includes eight holes.

In another example of any of the above described vane clusters for a gas turbine engine each of the EDM holes in the plurality of EDM holes is a 10/10/10 hole.

In another example of any of the above described vane clusters for a gas turbine engine the plurality of vanes consists of the first vane and the second vane.

In one exemplary embodiment a gas turbine engine includes a compressor section, a combustor section fluidly connected to the compressor section, a turbine section fluidly connected to the combustor section, the turbine section include a plurality of stages, at least one of the stages including a vane ring comprising multiple circumferentially adjacent vane clusters, wherein each of the vane clusters includes, an outer diameter platform, an inner diameter platform, a plurality of vanes spanning from the outer diameter platform to the inner diameter platform, at least one inbound region defined between a first vane of the plurality of vanes and a second vane of the plurality of vanes, the first vane including a suction side facing the inbound region, each of the vanes including a leading edge core passage and a trailing edge core passage, and a plurality of electrical discharge machined (EDM) holes disposed within at least 0.500 inches (12.7 mm) of a leading edge of the first vane, each of the EDM holes connecting a leading edge core passage of the vane to an exterior surface of the vane.

In another example of the above described gas turbine engine each EDM hole in the plurality of EDM holes is disposed in a visually obstructed region of the first vane.

In another example of any of the above described gas turbine engines each EDM hole in the plurality of EDM holes includes including a primary passage portion and a diffuser portion.

In another example of any of the above described gas turbine engines each of the primary passages has a diameter of approximately 0.015 inches (0.381 mm).

In another example of any of the above described gas turbine engines each of the primary passage portions connects to the leading edge core passage of the first vane, and each of the diffuser portions connects to a visually obstructed region of the first vane.

In another example of any of the above described gas turbine engines each of the diffuser portions includes a gradual increase in diameter from a connection to the corresponding primary passage portion to an exit at a visually obstructed region of the first vane.

In another example of any of the above described gas turbine engines each of the diffuser portions is connected to the corresponding primary passage portion via an opening and wherein the diffuser portions are offset from the primary portions at the corresponding opening.

In another example of any of the above described gas turbine engines the plurality of EDM holes includes from six to ten holes.

In another example of any of the above described gas turbine engines the plurality of EDM holes includes eight holes.

In another example of any of the above described gas turbine engines the plurality of vanes consists of the first vane and the second vane.

In another example of any of the above described gas turbine engines each of the EDM holes in the plurality of EDM holes is a 10/10/10 hole.

DETAILED DESCRIPTION OF AN EMBODIMENT

Figure 1:
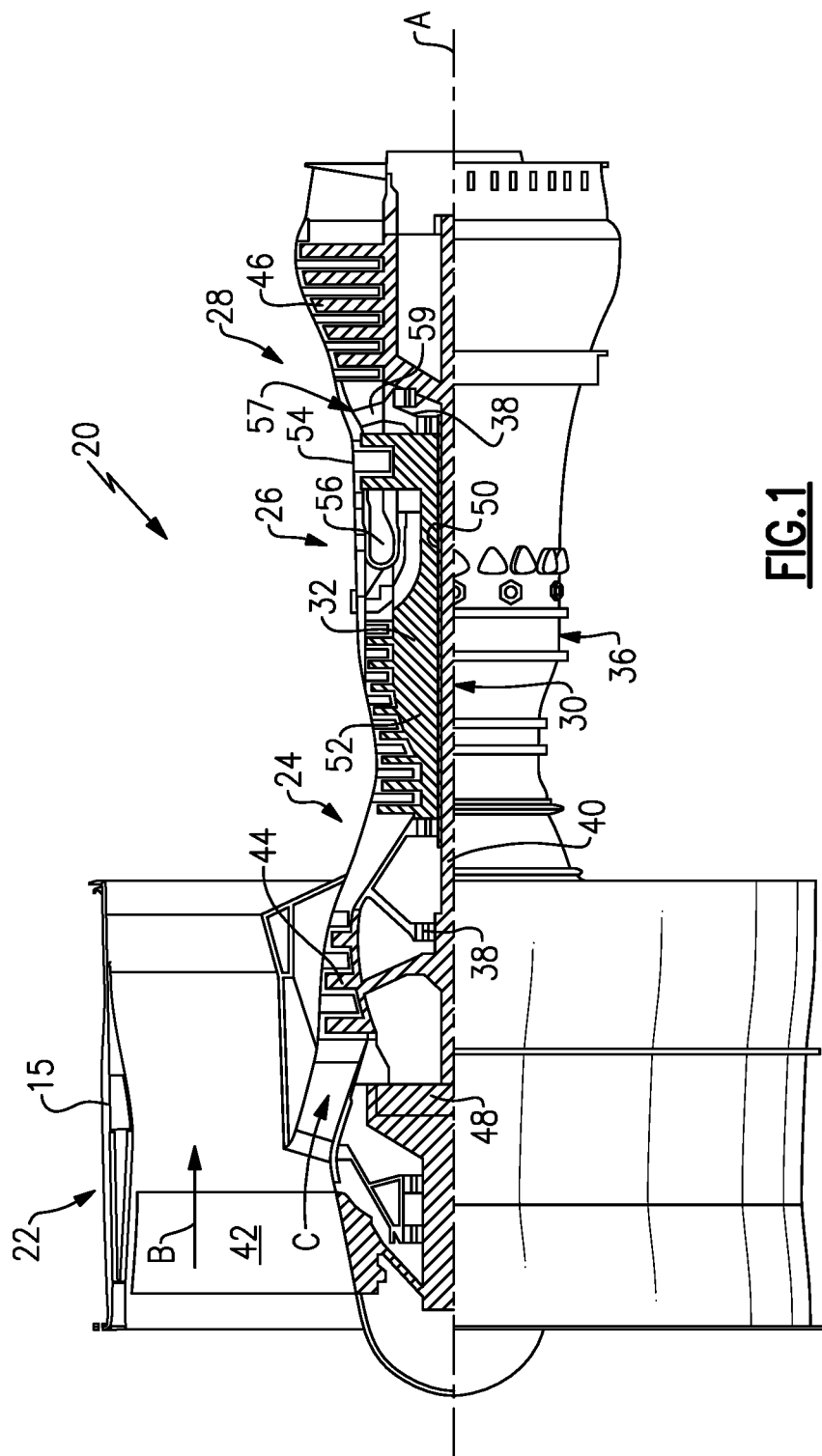
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]^−0.5. The "Low corrected fan tip speed" as disclosed herein according to one non-limiting embodiment is less than about 1150 ft/second (350.5 meters/second).

In some examples, each of the compressor stages and/or turbine stages includes multiple vanes configured as vane clusters. The vane clusters are single integral components including an outer diameter platform, an inner diameter platform, and two or more vanes spanning from the inner diameter platform to the outer diameter platform. The vane clusters are arranged in a ring with each vane cluster being adjacent to two other vane clusters in order to form the completed stage. Defined between the vanes in each vane cluster is an inbound region. When the vane cluster includes more than two vanes, an inbound region is defined between each adjacent vane in the vane cluster. In some example engines, it can be necessary to provide cooling air to the leading edge of one or more vanes in the vane cluster, and the configuration of the vanes can obstruct existing manufacturing techniques for incorporating this cooling.

Figure 2:
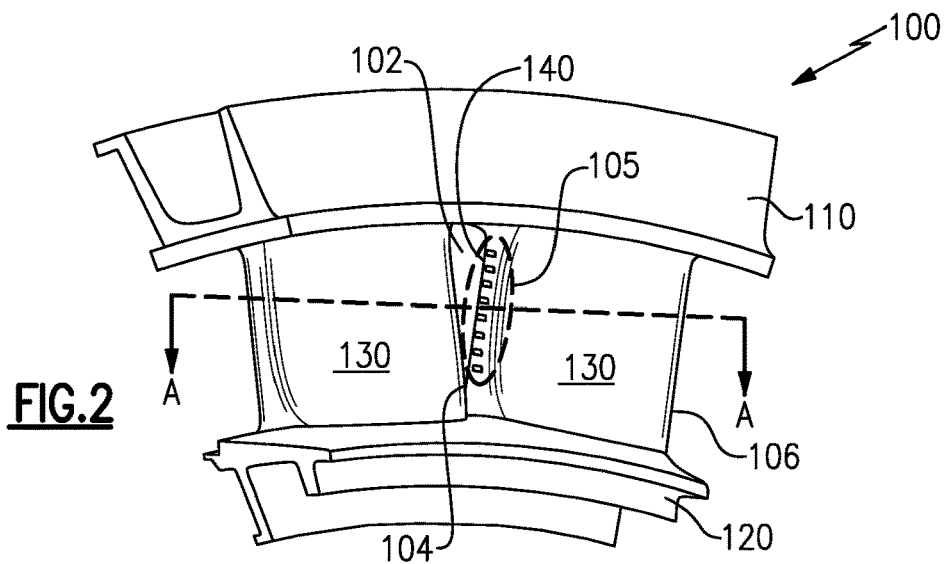
FIG. 2 schematically illustrates an axial view of an exemplary vane cluster according to one embodiment.
Figure 3:
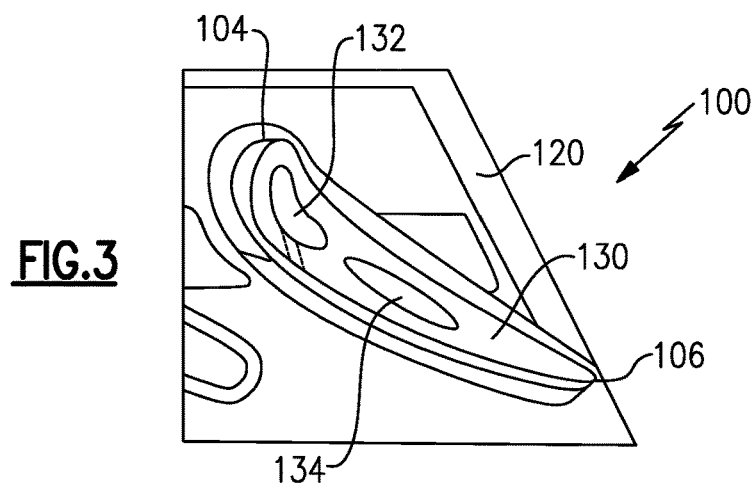
FIG. 3 schematically illustrates a radially inward view of a partial cross section of the vane cluster of FIG. 2.

FIGS. 2-3 schematically illustrate an exemplary cooling scheme for providing cooling to the leading edge of a vane 130 in a vane cluster 100, where the vane 130 has a suction side surface facing the inbound region 102, according to one embodiment. It should be appreciated that the cooling scheme can be applied to vane clusters including three, four, or any other number of additional vanes, with the illustrated features being disposed on any vanes with a suction side surface facing the inbound region.

With regards to FIG. 2, an exemplary vane cluster 100 is illustrated. The vane cluster 100 includes an outer diameter platform 110, an inner diameter platform 120, and multiple vanes 130 spanning from the outer diameter platform 110 to the inner diameter platform 120. Each of the vanes 130 includes a leading edge 104 and a trailing edge 106. The leading edge 104 is connected to the trailing edge 106 via a suction side surface and a pressure side surface. An inbound region 102 is defined between the vanes 130. Within the inbound region 102, is a visually obstructed region 105 on the suction side surface. The visually obstructed region 105 is a portion of the vane 130 where direct line of sight is obscured by another feature of the vane cluster 100, such as the other vane 130.

Included within each of the vanes 130 are multiple core cooling passages 132, 134 (see FIG. 3) including a leading edge core 132 and a trailing edge core 134. The leading edge core 132 is positioned proximate to the leading edge 104 of the vane 130, and provides a cooling flow that cools the leading edge 104. Similarly, the trailing edge core 134 is provided proximate to the trailing edge 106 and provides a cooling flow that cools the trailing edge 106 of the vane 130. In alternate examples, additional cores can be included beyond the leading edge core 132 and the trailing edge core 134.

To cool the leading edge 104 of the vane 130, multiple cooling holes 140 are included at or near the leading edge 104. Existing systems utilize cooling holes connecting the trailing edge core 134 to a forward portion of the suction side surface, and position the cooling holes correspondingly offset from the leading edge 104. In some examples, the positioning of the holes required to allow coolant to be drawn from a trailing edge core 134 is too far downstream of the leading edge 104 of the vane, and insufficient cooling is provided to the leading edge 104 of the vane 130.

Further, in some existing systems, due to the integral structure of the vane cluster 100, it can be difficult to create desirable cooling holes 140 in the vane 130 using existing techniques such as laser machining, when the vane 130 has a suction side surface facing the inbound region 102. In alternative embodiments including more than two vanes per cluster 100, each vane 130 that has a suction side surface facing an inbound region 102 can similarly require the cooling holes 140 and faces similar constructions difficulties using the existing techniques. The cooling hole configuration described herein can be extended to each of these vanes as well.

In order to mitigate stresses at the inbound region 102 resulting from insufficient cooling, the example vane cluster 100 shifts the forward most cooling holes 140 closer to the leading edge 104 of the vane 130, into the visually obstructed region 105 and connects the forward most cooling holes 140 to the leading edge core 132.

The illustrated example of FIG. 2 omits the conventional laser machined holes on the suction side of the vane 130, and replaces them with a set of electrical discharge machined (EDM) cooling holes 140 in the visually obstructed region 105 of the vane 130. With continued reference to FIG. 2, FIG. 3 schematically illustrates a cross sectional view along view line A-A, of the example of FIG. 2. In one example the set of EDM cooling holes 140 at the leading edge 104 includes eight EDM cooling holes 140. In alternative examples, the visually obstructed region 105 can include from six to ten EDM cooling holes 140.

The exemplary system of FIGS. 2 and 3 includes a greater flow of coolant through the leading edge core 132 than previous systems, and the removal of coolant from the leading edge core 132 due to the added EDM cooling holes 140 is offset by the increased cooling flow. In order to facilitate the increased cooling flow, the metering feature feeding the leading edge core was enlarged relative to previous systems. Further, the trailing edge core 134 is connected to fewer film cooling holes than existing systems, as shaped EDM cooling holes 140 provide better film cooling with fewer EDM cooling holes 140 than laser machined holes. The improved film effectiveness of the shaped EDM cooling holes arises primarily due to the shape of the diffuser 144 shown in FIG. 4. The EDM process enables the production of diffuser shapes that are more efficient than can be produced by the laser machine process.

Figure 4:
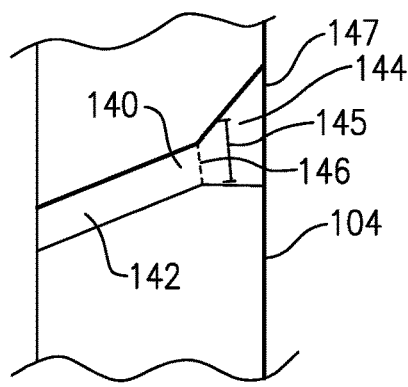
FIG. 4 schematically illustrates an exemplary shaped hole, such as could be used in the examples of FIGS. 2 and 3.

EDM manufacturing allows shaped EDM cooling holes 140 to be created instead of the simple holes created via laser machining, further facilitating the distribution of cooling air in a film cooling layer along the suction side surface. With continued reference to FIGS. 2 and 3, FIG. 4 schematically illustrates a cross section of an exemplary shaped hole 140. FIG. 5 illustrates an alternative construction of the shaped film cooling hole 140 according to one example. The shaped EDM cooling holes 140 include a primary passage portion 142, and a diffuser portion 144 connecting the primary passage portion 142 to the visually obstructed region 105. The primary passage portion 142 directs the cooling flow from the source (the leading edge core 132) to the visually obstructed region 105, while the diffuser section 144 diffuses the flow through the film cooling hole 140. The diffusion increases the adhesion of the cooling flow to the exterior surface of the vane 130, increasing the film cooling effect.

In some examples, such as the illustrated shaped hole 140, the primary passage portion 142 extends a majority of the wall's thickness and is joined to the diffuser portion 144 via an opening 146. The diffuser portion 144 expands the air, causing the air to remain closer to the surface. In order to facilitate diffusion, the diffuser portion 144 has a diameter 145 that increases from the opening 146 to an exit 147 at the visually obstructed region 105. In some examples, the diameter of the primary passage portion 142 is approximately 0.015 inches (0.381 mm).

In some examples, such as the illustrated examples, the transition along the diffuser portion 144 can be gradual. In yet more specific examples the diffuser portion 144 can be configured such that each diffuser surface is angled 10 degrees from a cooling hole centerline defined by the primary passage 142. Such a configuration is referred to as a 10/10/10 hole. In alternative examples, the diffuser portion 144 increases in diameter as a single step, or as multiple steps, instead of the gradual transition.

While illustrated in the instant example as being a doublet (including two vanes), it should be understood that the vane cluster 100 could include any number of additional vanes 130. In such an example the features related to, and facilitating, the leading edge EDM cooling holes 140, described above, are incorporated into each vane 130 whose suction side faces an inbound region 102.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vane cluster for a gas turbine engine comprising:
an outer diameter platform;
an inner diameter platform;
a plurality of vanes spanning from the outer diameter platform to the inner diameter platform;
at least one inbound region defined between a first vane of said plurality of vanes and a second vane of said plurality of vanes, the first vane including a suction side facing the inbound region;
each of said vanes including a leading edge core passage and a trailing edge core passage; and
no less than six and no more than ten electrical discharge machined (EDM) holes disposed within at least 0.500 inches (12.7 mm) of a leading edge of the first vane, each of the EDM holes connecting a leading edge core passage of the vane to an exterior surface of the vane.

2. The vane cluster of claim 1, wherein each EDM hole is disposed on the leading edge of the first vane.

3. The vane cluster of claim 1, wherein each EDM hole includes a primary passage portion and a diffuser portion.

4. The vane cluster of claim 3, wherein each of the primary passage portions has a diameter of 0.015 inches (0.381 mm).

5. The vane cluster of claim 3, wherein each of the primary passage portions connects to the leading edge core passage of the first vane, and each of the diffuser portions connects to the leading edge of the first vane.

6. The vane cluster of claim 3, wherein each of the diffuser portions includes a gradual increase in diameter from a connection to the corresponding primary passage portion to an exit at the leading edge of the first vane.

7. The vane cluster of claim 3, wherein each of the diffuser portions is connected to the corresponding primary passage portion via an opening and wherein the diffuser portions are offset from the primary portions at the corresponding opening.

8. The vane cluster of claim 1, wherein the no less than six and no more than ten EDM holes includes eight holes.

9. The vane cluster of claim 1, wherein each of the EDM holes is a 10/10/10 hole.

10. The vane cluster of claim 1, wherein the plurality of vanes consists of the first vane and the second vane.

11. A gas turbine engine comprising:
a compressor section;
a combustor section fluidly connected to the compressor section;
a turbine section fluidly connected to the combustor section, the turbine section include a plurality of stages, at least one of said stages including a vane ring comprising multiple circumferentially adjacent vane clusters, wherein each of the vane clusters comprises
an outer diameter platform;
an inner diameter platform;
a plurality of vanes spanning from the outer diameter platform to the inner diameter platform;
at least one inbound region defined between a first vane of said plurality of vanes and a second vane of said plurality of vanes, the first vane including a suction side facing the inbound region;
each of said vanes including a leading edge core passage and a trailing edge core passage; and
no less than six and no more than ten electrical discharge machined (EDM) holes disposed within at least 0.500 inches (12.7 mm) of a leading edge of the first vane, each of the EDM holes connecting a leading edge core passage of the vane to an exterior surface of the vane.

12. The gas turbine engine of claim 11, wherein each EDM hole is disposed in a visually obstructed region of the first vane.

13. The gas turbine engine of claim 11, wherein each EDM hole includes a primary passage portion and a diffuser portion.

14. The gas turbine engine of claim 13, wherein each of the primary passages has a diameter of 0.015 inches (0.381 mm).

15. The gas turbine engine of claim 13, wherein each of the primary passage portions connects to the leading edge core passage of the first vane, and each of the diffuser portions connects to a visually obstructed region of the first vane.

16. The gas turbine engine of claim 13, wherein each of the diffuser portions includes a gradual increase in diameter from a connection to the corresponding primary passage portion to an exit at a visually obstructed region of the first vane.

17. The gas turbine engine of claim 13, wherein each of the diffuser portions is connected to the corresponding primary passage portion via an opening and wherein the diffuser portions are offset from the primary portions at the corresponding opening.

18. The gas turbine engine of claim 11, wherein the no less than six and no more than ten EDM holes includes eight holes.

19. The gas turbine engine of claim 11, wherein the plurality of vanes consists of the first vane and the second vane.

20. The gas turbine engine of claim 11, wherein each of the EDM holes is a 10/10/10 hole.

* * * * *